(12) United States Patent
Spoldi

(10) Patent No.: US 8,825,233 B2
(45) Date of Patent: Sep. 2, 2014

(54) SYNTHETIC ESTIMATION OF ROTORCRAFT AIRSPEED

(75) Inventor: Steven E. Spoldi, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 452 days.

(21) Appl. No.: 13/484,761

(22) Filed: May 31, 2012

(65) Prior Publication Data

US 2013/0325218 A1 Dec. 5, 2013

(51) Int. Cl.
*G05D 1/00* (2006.01)
*G05D 1/08* (2006.01)
*G05D 3/00* (2006.01)
*G06F 7/00* (2006.01)
*G06F 17/00* (2006.01)

(52) U.S. Cl.
USPC ....... 701/7; 701/1; 701/14; 340/945; 340/969

(58) Field of Classification Search
USPC ........ 701/1, 3, 7, 14; 340/945, 969, 973, 978; 73/1.37
See application file for complete search history.

(56) References Cited

U.S. PATENT DOCUMENTS

| | | | |
|---|---|---|---|
| 2,524,747 A | 10/1950 | Ayres et al. | |
| 2,713,156 A | 7/1955 | Guarino | |
| 4,300,200 A | 11/1981 | Doe | |
| 4,371,937 A | 2/1983 | Adams et al. | |
| 4,766,767 A | 8/1988 | Hassenpflug et al. | |
| 4,794,793 A | 1/1989 | Favre et al. | |
| 4,829,441 A | 5/1989 | Mandle et al. | |
| 5,214,596 A | 5/1993 | Muller | |
| 5,478,029 A * | 12/1995 | Schmitz | 244/17.11 |
| 5,850,615 A | 12/1998 | Osder | |
| 5,890,101 A | 3/1999 | Schaefer, Jr. et al. | |
| 7,907,066 B2 | 3/2011 | Certain | |
| 2008/0249672 A1 | 10/2008 | Cherepinsky | |

FOREIGN PATENT DOCUMENTS

DE 10315590 10/2004

OTHER PUBLICATIONS

Notification of Transmittal of the Extended Search Report and the European Opinion for European Application No. 13160597.4-1558; Mailed Sep. 17, 2013.

* cited by examiner

*Primary Examiner* — Rami Khatib
(74) *Attorney, Agent, or Firm* — Cantor Colburn LLP

(57) ABSTRACT

A method for estimating airspeed of an aircraft includes receiving values indicative of operating conditions of the aircraft along an axis; estimating a tip path plane (TPP) angle along the axis from at least one of the operating conditions to create an estimated TPP angle; and determining an estimated airspeed as a function of the estimated TPP angle, the determining including referencing a look-up table that indexes the estimated TPP angle with the airspeed.

16 Claims, 3 Drawing Sheets

SYNTHETIC ESTIMATION OF ROTORCRAFT AIRSPEED

STATEMENT REGARDING FEDERALLY SPONSORED RESEARCH OR DEVELOPMENT

This invention was made with Government support under N00019-06-C-0081 awarded by the Department of the Navy. The Government has certain rights in this invention.

FIELD OF INVENTION

The subject matter disclosed herein relates generally to the field of measurements in a rotary-wing aircraft and, more particularly, to a method and a system for determining an airspeed of a helicopter by utilizing a fly-by-wire system to estimate a tip path plane angle and resolving the steady state speed of the helicopter as a function of the known helicopter parameters.

DESCRIPTION OF RELATED ART

Many vehicles, including helicopters, use fly-by-wire (FBW) systems to control vehicle operation. Emerging FBW helicopters provide high levels of augmentation. These systems greatly reduce pilot workload and enhance safety. Part of the safety enhancements includes control inputs that allow pilots to aggressively maneuver within the airframe structural limits and not exceed these limits. With these systems, it is possible for the flight control system to provide a variety of tactile cues (such as power cues, level flight cues, control limit cues, etc.) to the pilot. Knowledge of rotorcraft airspeed is needed to facilitate optimal flight control operation for FBW systems. Typically, air speed is derived from an externally mounted sensor on the airframe. However, this sensor can fail due to mechanical defects or environmental conditions such as, for example, ice that may accumulate on the sensor. Improvements in providing an estimation of rotorcraft airspeed from information available within the FBW controls would be well received in the art.

BRIEF SUMMARY

According to one aspect of the invention, a method for estimating an airspeed of a rotary wing aircraft, includes receiving values indicative of operating conditions of the aircraft along an axis; estimating a tip path plane (TPP) angle along the axis from at least one of the operating conditions to create an estimated TPP angle; and determining an estimated airspeed as a function of the estimated TPP angle, the determining including referencing a look-up table that indexes the estimated TPP angle with the airspeed.

According to another aspect of the invention, a system for estimating an airspeed of an aircraft, includes a memory that indexes an estimated TPP angle with an estimated airspeed of the aircraft; a processor that receives values indicative of operating conditions of the aircraft along an axis and determines the estimated TPP angle along the axis from at least one of the operating conditions; where the processor determines an estimated airspeed as a function of the estimated TPP angle.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of an airspeed estimating algorithm includes estimating a TPP angle as a function of a pitch attitude. The algorithm estimates the airspeed by utilizing a lookup table that has stored values of several TPP angles against an estimated aircraft airspeed. In an embodiment, the estimated airspeed may accommodate acceleration by correcting the estimated TPP angle as a function of the longitudinal acceleration prior to utilizing the lookup table for determining the estimated aircraft speed.

Figure 1:
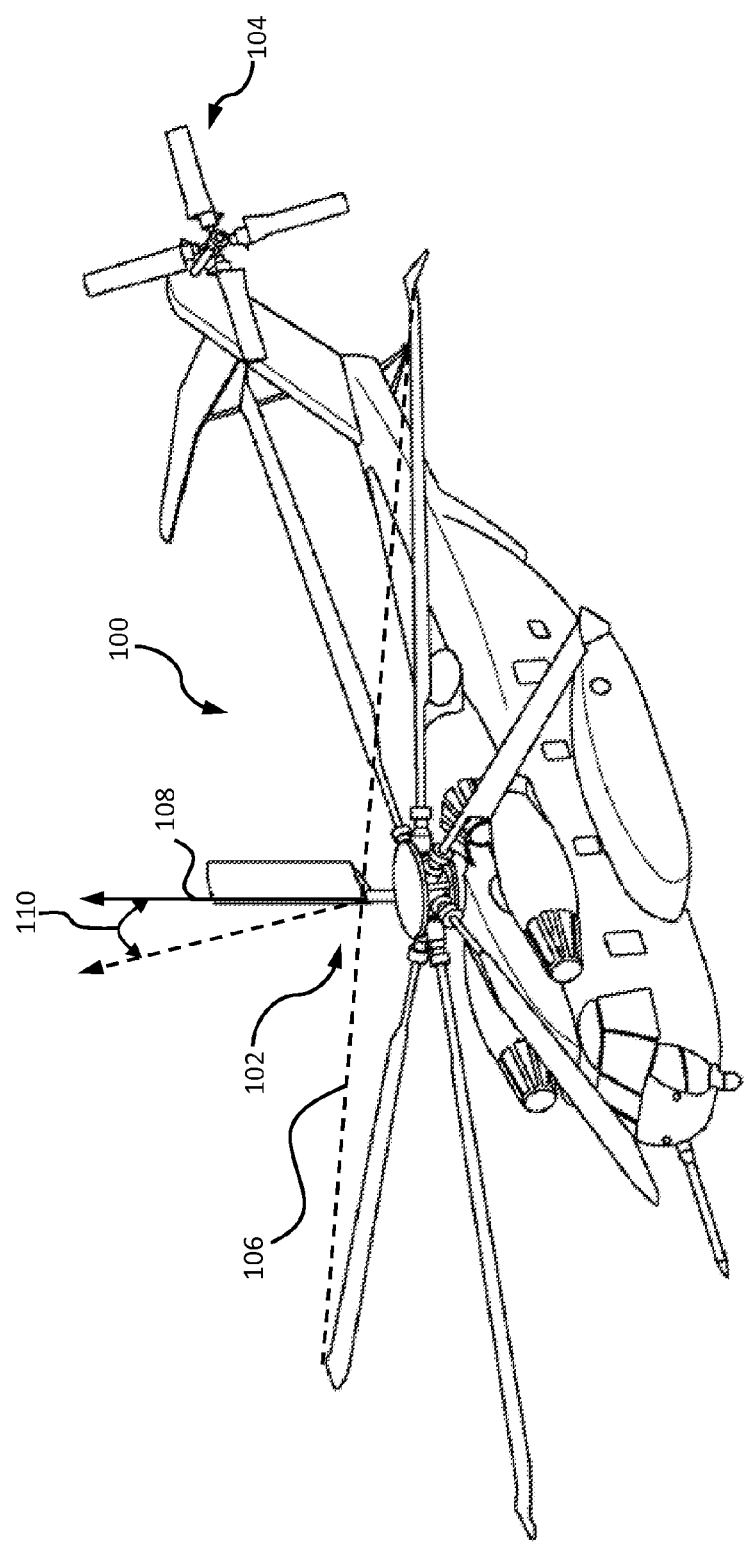
FIG. 1 is a perspective view of an exemplary rotary wing aircraft for use with embodiments of the invention.

Referring now to the drawings, FIG. 1 illustrates a general perspective view of an exemplary vehicle in the form of a vertical takeoff and landing (VTOL) rotary-wing aircraft 100 for use with estimating the airspeed of the rotary-wing aircraft 100 according to an embodiment of the invention. The rotary-wing aircraft 100 includes a main rotor assembly 102 and a tail rotor assembly 104. Also, a tip path plane 106 is shown connecting the rotor blade tips as the rotor blades rotate during flight. The TPP 106 is horizontal to the longitudinal axis of the aircraft 100 as it hovers and its thrust vector is oriented along a vertical axis 108. When the aircraft 100 travels forward, the thrust vector is rotated slightly in a forward direction, resulting in the TPP angle ($\alpha$) 110. The airspeed of the aircraft 100 may be estimated from the TPP angle 110 as a function of the parameters from a fly-by-wire flight control system 200 utilizing a known relationship between the airspeed of the aircraft and the TPP angle 110. Although a particular helicopter configuration is illustrated and described in disclosed embodiments, other configurations and/or machines, such as high speed compound rotary-wing aircraft with supplemental translational thrust systems, dual contra-rotating coaxial rotor system aircraft, tilt-rotors, tilt-wing aircraft, and unmanned rotary wing aircraft with any of the previous configurations will also benefit from embodiments of the present invention.

Figure 2:
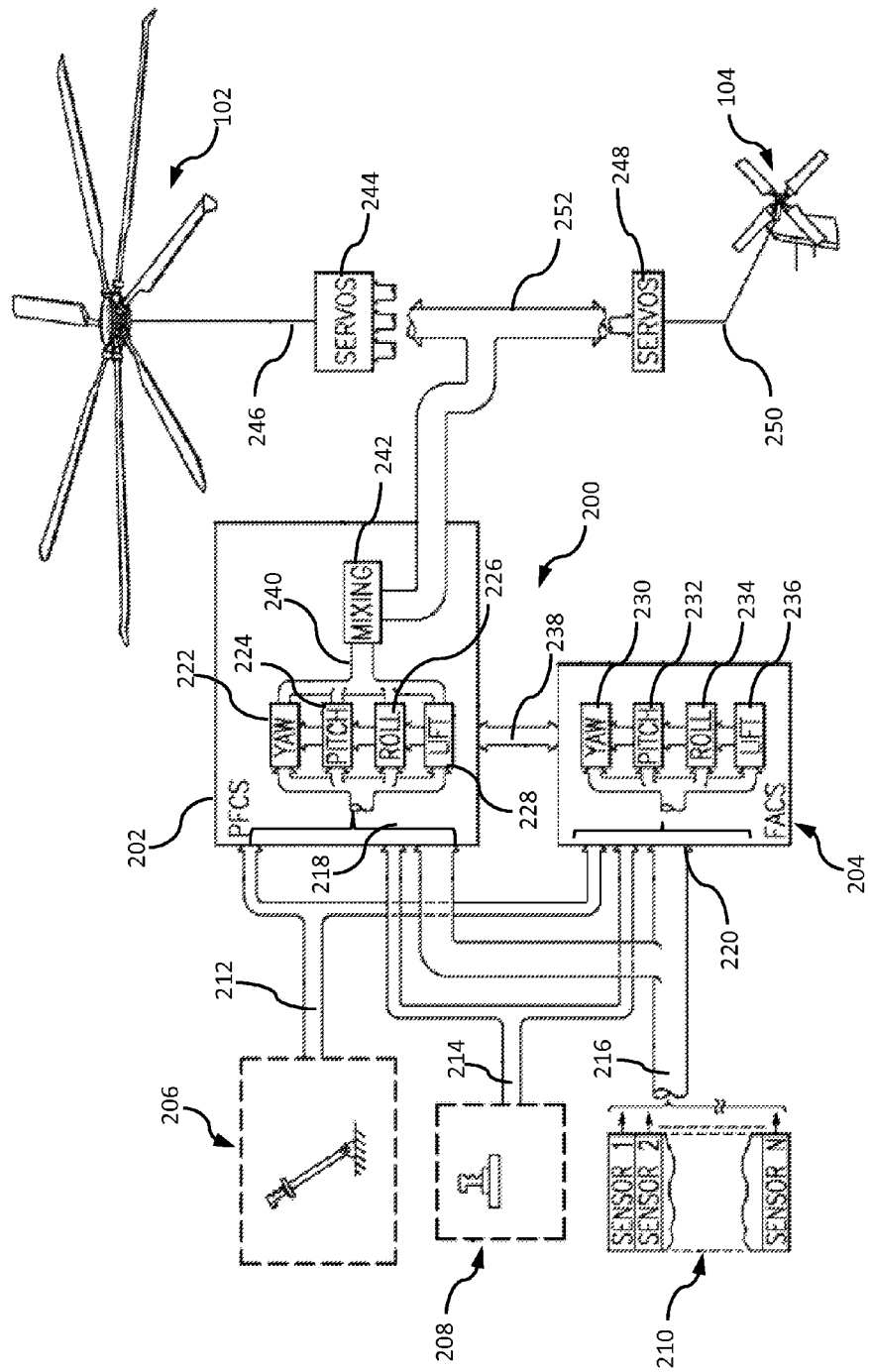
FIG. 2 is a schematic diagram of an exemplary flight control system.

FIG. 2 illustrates a schematic block diagram of a fly-by-wire flight control system 200 according to an exemplary embodiment. In an embodiment, Particularly, the system 200 is stored on a flight control computer system and estimates the TPP angle 110 (FIG. 1) as a function of a displacement of the pilot's controllers 206, 208 in order to provide an estimate of the aircraft 100 airspeed from the TPP angle 110. The system 200 includes a Primary Flight Control System (PFCS) 202 and an Automatic Flight Augmentation and Cuing System (FACS) 204.

In an example of a flight control system 200, the PFCS 202 and FACS 204 execute explicit control laws to provide both control and stability augmentation. The PFCS 202 is the flight critical portion of the flight control system, while the FACS 204 is the mission critical portion. The FACS 204 augments the performance of the PFCS 202. In this control law architecture, pilot commands are shaped directly into desired aircraft responses. These desired commands are then passed through an aircraft model to obtain the control commands required to produce the desired response. The difference between the desired command and the aircraft response is also fed back to drive these errors towards zero, thus improving the model performance.

The PFCS 202 and FACS 204 each receive the force output command signals of a collective controller 206 on line 212, a cyclic controller 208 on line 214, and the aircraft's sensed parameter signals from sensors 210, on lines 216. The collective controller 206 and the cyclic controller 208 may take various forms including sidearm controllers, a yaw pedal system or other such flight controllers. The pilot command signals on lines 212, 214 and the sensed parameter signals on lines 216 are shown consolidated within trunk lines 218 and 220 in the PFCS 202 and FACS 204, respectively.

The PFCS 202 and FACS 204 may each contain separate control channel logic laws for controlling the yaw, pitch, roll and lift axes of the aircraft within the operational flight envelope. The logic is included in the PFCS 202 and FACS 204 control modules (schematically represented by blocks 222-228 for the PFCS 202 and blocks 230-236 for the FACS 204). The sensed parameter signals from aircraft sensors 210, on lines 216, provide the PFCS 202 and FACS 204 with the aircraft's angular rate and attitude response to the rotor command signals. In an embodiment, the FACS 204 utilizes an algorithm for estimating the tip path plane angle 110 and uses an airspeed model stored in memory for determining the airspeed of the aircraft based on a known relationship between angle 110 and airspeed, derived through flight test data or simulation. The FACS logic utilizes the sideslip envelope to limit the yaw rate available to the pilot for producing a desired response without exceeding the operational flight envelope. The PFCS logic provides rotor command signals and the FACS logic provides conditioning and/or trimming of the PFCS four axis logic functions based on the operational flight envelope. The PFCS and FACS logic modules interconnect through bus 238 to provide rotor command signals on output lines 240 to a mixing function 242, which communicates commands on lines 252 for the displacement of servos 244 and linkages 246 to control the tip path plane 106 (FIG. 1) of the main rotor 102. A mixed command signal is also provided on line 250 to the tail rotor servos 248 which control the thrust of the tail rotor 104 through linkages 250.

Figure 3:
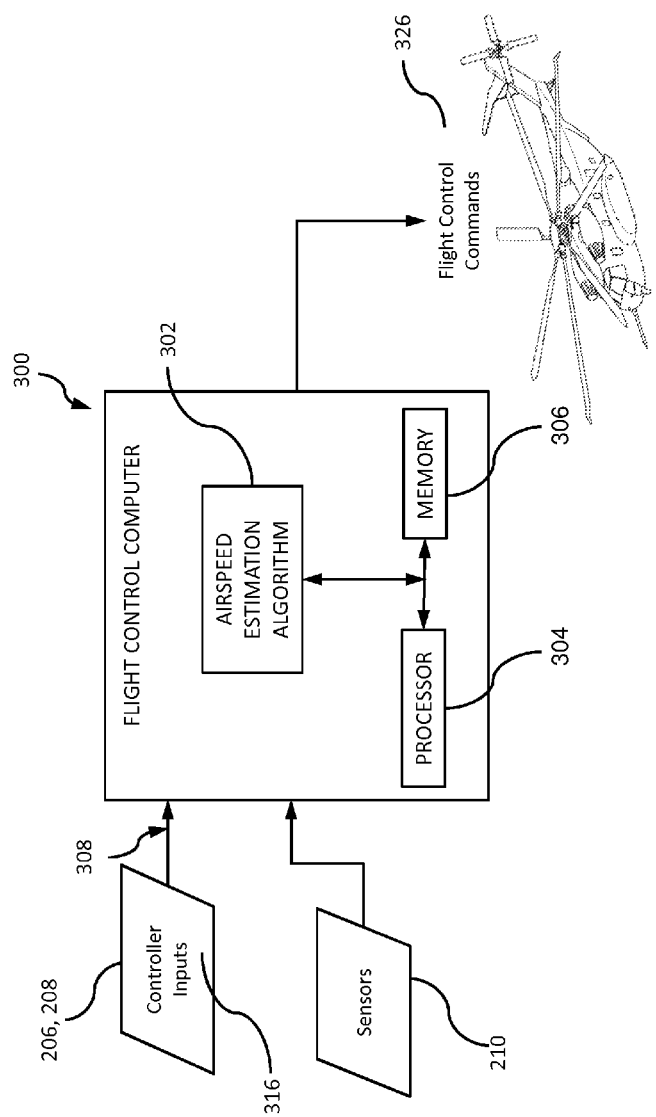
FIG. 3 illustrates a schematic block diagram of an algorithm used for estimating airspeed of an aircraft according to an embodiment of the invention.

FIG. 3 illustrates a schematic block diagram of an airspeed estimation algorithm 302 implemented by the FACS 204 (FIG. 2) of the fly-by-wire flight control system 200 which communicates with, in an exemplary embodiment, the control law system of the PFCS 202 (FIG. 2) according to an embodiment of the invention. For ease of illustration and understanding, the functional block diagram in FIG. 3 illustrates the airspeed estimation algorithm 302 stored in memory 306 on flight control computer system 300 and executed by a microprocessor 304 for implementing the algorithm 302 intended to provide an estimate of the airspeed from the TPP angle 110 (FIG. 1) and as a function of aircraft operational parameters obtained from flight test data or simulated parameters during non-accelerated flight. The microprocessor 304 of computer system 302 can be any type of processor (CPU), including a general purpose processor, a digital signal processor, a microcontroller, an application specific integrated circuit, a field programmable gate array, or the like. Also, in embodiments, memory 306 may include random access memory (RAM), read only memory (ROM), or other electronic, optical, magnetic, or any other computer readable medium onto which is stored the data and control algorithms described below. It is to be appreciated that the airspeed estimation algorithm 302 described below for estimating the airspeed for travel along the longitudinal axis of aircraft 100 over a reference position but travel along the lateral axis may also be implemented.

In an embodiment, for a longitudinal axis direction of travel of the aircraft 100, the microprocessor 304 initiates the airspeed estimation algorithm 302 by receiving and storing the aircraft's sensed parameter signals. In an embodiment, the aircraft's senses parameter signals include several aircraft operating parameters such as, in some non-limiting examples, lateral acceleration, aircraft attitude, aircraft's angular rate in order to estimate the aircrafts sideslip angle. The sensed parameter signals are received from appropriate sensors 210 in response to compensation in the flight attitude for, in an example, wind-induced perturbations from a steady-state horizontal flight. In one non-limiting example, the flight attitude may be compensated by displacing the controller 206 forward in order to change the longitudinal swash plate position and change the pitch angle θ to move the aircraft 100 forward. In one embodiment, the pitch angle θ is the angle between the longitudinal axis of the aircraft and a defined reference plane. The change in pitch angle θ causes a change in the longitudinal force along the longitudinal axis. In one example, displacing the controller 206 for moving the aircraft 100 forward causes the rotor to tip backwards in order to compensate for the prevailing wind, resulting in leveling the rotor angle. The microprocessor 304 uses the pitch angle or attitude θ and the displacement value 308 of the controller 206 for estimating the TPP angle 110 ($\alpha_E$) according to equation (1) below:

$$\alpha_E = K^*(\theta + (A^*B_1 s) + B); \quad (1)$$

where:
$\alpha_E$ = estimated TPP angle;
K, A, B = Constants derived from simulation data;
θ = Pitch angle; and
$B_1 s$ = longitudinal main rotor swash plate position.

Further, the flight control computer 300 stores one or more lookup tables in memory 306 where operational conditions may be maintained for a particular airframe. particularly, the one or more tables defines estimates for the airspeed against several TPP angles 110 derived from, in some non-limiting examples, simulated data or flight test data.

In an embodiment, the algorithm 302 may correct the estimated TPP angle for accelerated flight along the longitudinal axis by utilizing equation (2) below:

$$\alpha_C = \alpha_E - A_x/G; \quad (2)$$

where:
$\alpha_C$ = the corrected TPP angle;
$A_x$ = longitudinal acceleration of the aircraft 100; and
G = Acceleration due to gravity of 9.80665 m/s² (or approx. 32.174 ft/s²).

Further, one or more tables that defines estimates for the airspeed against the TPP angle 110 derived from, in some non-limiting examples, simulated data or flight test data may be utilized for estimating the airspeed.

Embodiments for estimating airspeed described herein may be used in conjunction with a pitot tube system for measuring airspeed. The airspeed estimating algorithm may be used to verify proper operation of a pitot tube system. Further, the airspeed estimating algorithm may be used to detect a common mode failure (e.g., icing) across multiple pitot tubes.

The technical effects and benefits of exemplary embodiments include an airspeed estimating algorithm from a TPP angle. In an embodiment, the system includes estimating the TPP angle as a function of the pitch attitude and utilizing a lookup table that defines stored values of several TPP angles against estimated aircraft airspeed. Also, the algorithm accommodates acceleration of the aircraft by correcting the estimated TPP angle as a function of the longitudinal acceleration.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for estimating airspeed of an aircraft, comprising:
   receiving, using a processor, values indicative of operating conditions of the aircraft along an axis;
   estimating, using a processor, a tip path plane (TPP) angle along the axis from at least one of the operating conditions to create an estimated TPP angle; and
   determining, using a processor, an estimated airspeed as a function of the estimated TPP angle, the determining including referencing a look-up table that indexes the estimated TPP angle with the airspeed.

2. The method of claim 1, wherein the estimating of the TPP angle further comprises applying the following equation:

$$\alpha_E = K^*(\theta + (A^*B_1 s) + B); \quad (1)$$

where:
$\alpha_E$ = the estimated TPP angle;
K, A, B = Constants;
$\theta$ = Pitch angle; and
$B_1 s$ = main rotor swash plate position.

3. The method of claim 2, further comprising correcting the estimated TPP angle for acceleration along the axis according to the following equation:

$$\alpha_C = \alpha_E - A_x/G; \quad (2)$$

where:
$\alpha_C$ = the corrected TPP angle;
$A_x$ = longitudinal acceleration of the aircraft; and
G = Acceleration due to gravity.

4. The method of claim 1, wherein the axis includes one of a longitudinal axis or a lateral axis.

5. The method of claim 1, wherein the operating conditions includes lateral acceleration, attitude, and angular rate.

6. The method of claim 1, wherein the TPP angle corresponds to a controller displacement.

7. The method of claim 1, further comprising receiving the at least one operating condition from one or more sensors.

8. The method of claim 1, wherein the axis corresponds to the pitch.

9. A system for estimating airspeed of an aircraft, comprising:
   a memory that indexes an estimated TPP angle with an estimated airspeed of the aircraft;
   a processor that receives values indicative of operating conditions of the aircraft along an axis and determines the estimated TPP angle along the axis from at least one of the operating conditions;
   wherein the processor determines an estimated airspeed as a function of the estimated TPP angle.

10. The system of claim 9, wherein the processor determines the estimated TPP angle according to the following equation:

$$\alpha_E = K^*(\theta + (A^*B_1 s) + B); \quad (1)$$

where:
$\alpha_E$ = the estimated TPP angle;
K, A, B = Constants;
$\theta$ = Pitch angle; and
$B_1 s$ = main rotor swash plate position.

11. The system of claim 10, wherein the processor corrects the estimated TPP angle for acceleration along the axis according to the following equation:

$$\alpha_C = \alpha_E - A_x/G; \quad (2)$$

where:
$\alpha_C$ = the corrected TPP angle;
$A_x$ = longitudinal acceleration of the aircraft; and
G = Acceleration due to gravity.

12. The system of claim 9, wherein the axis includes one of a longitudinal axis or a lateral axis.

13. The system of claim 9, wherein the operating conditions includes lateral acceleration, attitude, and angular rate.

14. The system of claim 9, wherein the estimated TPP angle corresponds to a controller displacement.

15. The system of claim 9, further comprising one or more sensors that receive the at least one operating condition.

16. The system of claim 9, wherein the axis corresponds to the pitch.

* * * * *